(12) United States Patent
Yun

(10) Patent No.: US 11,645,648 B2
(45) Date of Patent: May 9, 2023

(54) METHOD AND SYSTEM FOR PROVIDING FOREIGN CURRENCY EXCHANGE SERVICES BASED ON NET EXCHANGE DEMAND BETWEEN COUNTRIES

(71) Applicant: CASHMALLOW CO., LTD., Seoul (KR)

(72) Inventor: Hyeong Un Yun, Yeosu-si (KR)

(73) Assignee: CASHMALLOW CO., LTD., Seoul (KR)

( * ) Notice: Subject to any disclaimer, the term of this patent is extended or adjusted under 35 U.S.C. 154(b) by 289 days.

(21) Appl. No.: 16/880,565

(22) Filed: May 21, 2020

(65) Prior Publication Data

US 2021/0125176 A1      Apr. 29, 2021

(30) Foreign Application Priority Data

Oct. 23, 2019  (KR) .................. 10-2019-0132115

(51) Int. Cl.
*G06Q 20/38* (2012.01)
*G06Q 20/10* (2012.01)
(Continued)

(52) U.S. Cl.
CPC ....... *G06Q 20/381* (2013.01); *G06Q 20/1085* (2013.01); *G06Q 20/3223* (2013.01); *G06Q 20/3676* (2013.01)

(58) Field of Classification Search
None
See application file for complete search history.

(56) References Cited

U.S. PATENT DOCUMENTS 11,182,776 B1 *   11/2021   Bhos .................... G06Q 20/389
2007/0210937 A1 *  9/2007   Smith ................... G06Q 30/02
                                                      340/995.1
(Continued)

FOREIGN PATENT DOCUMENTS

CN       102160069 A      8/2011
CN       109983497 A      7/2019
(Continued)

OTHER PUBLICATIONS

Das, Rajib Chandra, et al. "Location based ATM Locator System using OpenStreetMap," The 8th International Conference on Software, Knowledge, Information Management and Applications, (Dec. 1, 2014). (Year: 2014).*

*Primary Examiner* — Elizabeth H Rosen
(74) *Attorney, Agent, or Firm* — Dinsmore & Shohl LLP; Yongsok Choi, Esq.

(57) ABSTRACT

Provided is a method for providing foreign currency exchange services performed by a main server. The present invention is characterized in that a method for depositing money is provided in a variety of methods, such as direct deposit, card payment, and firm banking, and withdrawal can be performed from abroad through a method (ATM terminal, affiliated store, or the like abroad) which is different from the method for depositing money. In this process, the exchange fee of the bank is eliminated, and the service operator of the present invention can establish an operation policy for the fee or the like. In addition, there is a great effect in that the service operator provides the users with the foreign currency exchange services with a lower fee than that of the commercial bank.

12 Claims, 6 Drawing Sheets

(51) Int. Cl.
*G06Q 20/32* (2012.01)
*G06Q 20/36* (2012.01)

(56) References Cited

U.S. PATENT DOCUMENTS

| | | |
|---|---|---|
| 2012/0136779 A1 | 5/2012 | Nonaka |
| 2013/0018738 A1* | 1/2013 | Faires ................. G06Q 20/381 |
| | | 705/16 |
| 2016/0140555 A1* | 5/2016 | Scipioni ................ G06Q 20/20 |
| | | 705/43 |

FOREIGN PATENT DOCUMENTS

| | | | |
|---|---|---|---|
| KR | 1020160022204 A | 2/2016 | |
| TW | 547144 U * | 8/2017 | ............. H04N 17/00 |

* cited by examiner

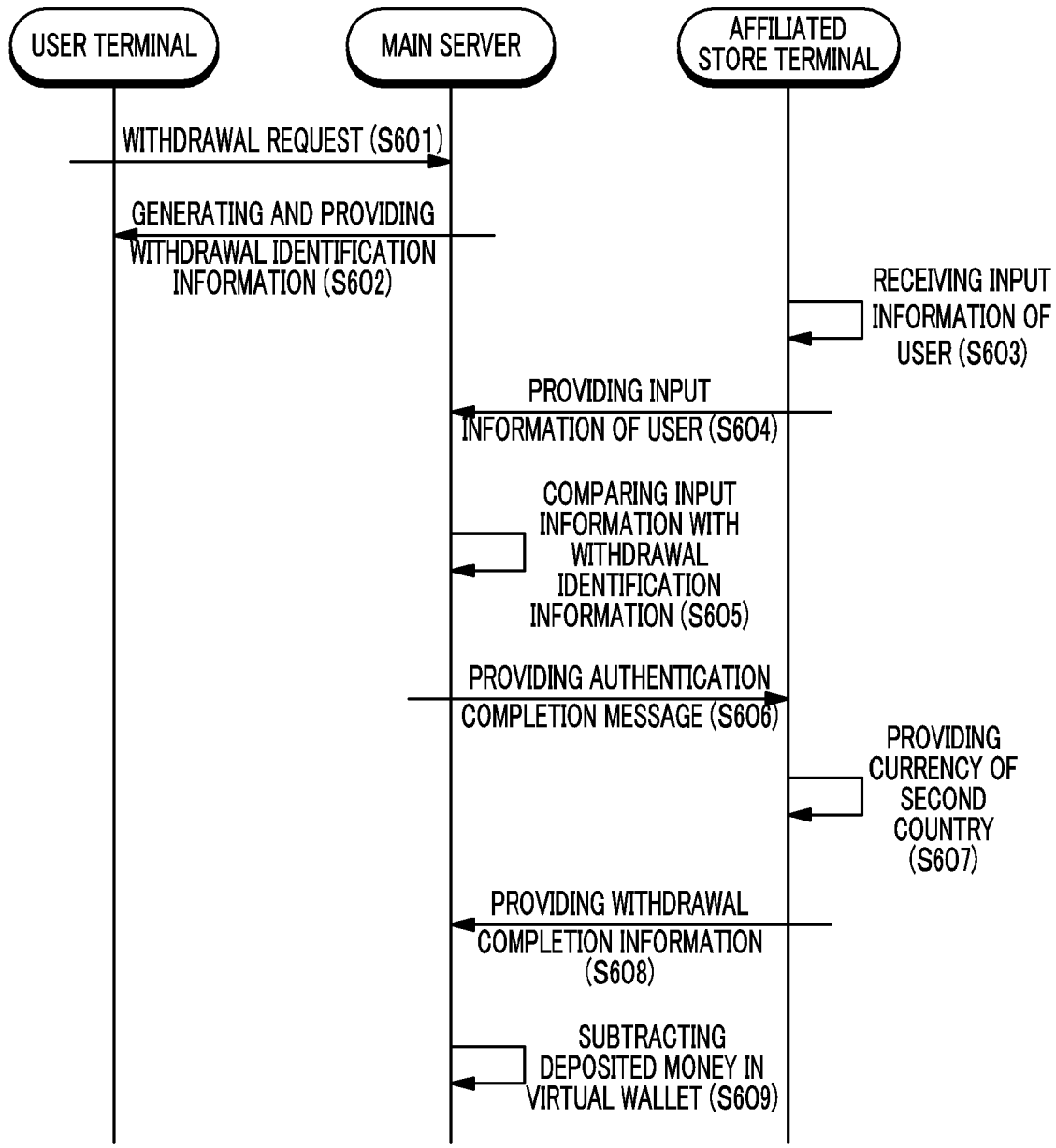

METHOD AND SYSTEM FOR PROVIDING FOREIGN CURRENCY EXCHANGE SERVICES BASED ON NET EXCHANGE DEMAND BETWEEN COUNTRIES

CROSS-REFERENCE TO RELATED APPLICATION

This application claims priority to and the benefit of Korean Patent Application No. 10-2019-0132115 filed in the Korean Intellectual Property Office on Oct. 23, 2019, the entire contents of which are incorporated herein by reference.

BACKGROUND OF THE INVENTION

1. Field of the Invention

The present invention relates to a method and a system for providing foreign currency exchange services based on a net exchange demand between countries. In more detail, the present invention relates to a service in which even if a user does not have a bank account in a currency of another country, the user is able to perform a foreign currency exchange or withdrawal for the currency of the other country through a low fee in the other country.

2. Description of the Related Art

With a recent development of transportation, the number of people traveling abroad is increasing. Accordingly, there is a growing trend of the foreign currency exchange for money used in a country the traveler visits.

Since overseas travel is highly uncertain, a traveler still tends to prefer cash. In addition, due to the development of low-cost airlines, a share of travelers who are 18 to 34 years old, who are highly sensitive to price, is increasing, and information on the foreign currency exchange on the Internet is becoming active.

However, as the traveler performs the foreign currency exchange in large amounts of money to avoid cash shortages in unfamiliar places, an approximate 80% of the travelers are left with exchanged foreign currency after travel. Since the fee is determined by the amount of money of the foreign currency exchange, a generous amount of money of the foreign currency exchange causes the traveler to spend unnecessary fees.

In addition, in a case of a shortage of cash during travel, the travelers have very limited means for additionally performing the foreign currency exchange on site. Therefore, many travelers are paying high fees at a global ATM or a hotel to perform the additional foreign currency exchange.

In addition, the foreign currency exchange services of the related art has a limitation that the bank which provides the foreign currency exchange services for non-mainstream currency is limited and there are few preferential treatments.

SUMMARY OF THE INVENTION

The present invention is provided to solve the problems of the related art described above, and an object of the present invention is "to provide foreign currency exchange services based on a net exchange demand between countries", that is, services in which a foreign currency exchange for money and withdrawal with respect to the exchanged money can be performed even if a traveler does not have a bank account used in a local country.

Another object thereof is to provide a creation of an environment in which a user can freely perform the foreign currency exchange with a low exchange fee without being bound by time through the foreign currency exchange services of the present invention, even if a user does not have a bank account using a currency of another country.

However, the technical problem to be achieved by the present example is not limited to the technical problem as described above, and other technical problems may exist.

As technical means for achieving the technical problem described above, according to an example of the present invention, there is provided a method for providing foreign currency exchange services for a person performed by a main server after departure, the method comprising: (a) when a request of a foreign currency exchange is received from a user terminal registered in a telecommunication company of a first country, providing deposit request information corresponding to the request of the foreign currency exchange; (b) when it is confirmed that a payment or transfer is completed according to the deposit request information, depositing an amount of money of a currency of the first country, which is currency-exchanged into a currency of a second country in a virtual wallet corresponding to the user terminal; (c) providing the user terminal with withdrawal identification information and position information of a withdrawal target object after confirming a balance of the virtual wallet with respect to the user terminal; and (d) in the second country, as the user of the user terminal visits a place where the withdrawal target object is positioned to provide predetermined input information, when input information of a user is received from the withdrawal target object and the input information of the user and the withdrawal identification information correspond to each other, causing the withdrawal of the amount of money of the foreign currency exchange requested by the user terminal to be performed within an amount of money deposited in the currency of the second country through a withdrawal target object, wherein the withdrawal target object means an affiliated store of the second country, or an automated teller machine (ATM) terminal of the second country, and wherein the virtual wallet is linked to a first country main account of a first country bank server and a second country main account of a second country bank server, the deposited currency of the first country is transmitted to the first country main account, the requested withdrawal money is withdrawn from the second country main account, and the first country main account and the second country main account are associated with the main server.

In addition, the step (a) comprises: receiving information of the second country, of which the currency is to be exchanged and an amount of money of the currency of the first country to be deposited by the user, from the user terminal; providing the user terminal with an exchangeable amount of money based on the currency of the second country, based on a predetermined exchange rate; and providing a comparison interface capable of comparing an exchangeable amount of money based on a commercial bank exchange rate of the first country with an exchangeable amount of money based on the predetermined exchange rate, and receiving the request of the foreign currency exchange. The predetermined exchange rate is calculated in consideration of a predetermined exchange fee and may be cheaper than the commercial bank exchange fee of the first country.

In addition, receiving the identification information of the second country of which the currency is to be exchanged, and the amount of money of the currency of the first country to be deposited by the user, from the user terminal, comprises: providing a user interface for inputting the amount of currency of the first country converted according to the predetermined exchange rate based on the amount of money of the currency of the second country as a requested amount of money of the foreign currency exchange.

In addition, providing the user terminal with a search interface for searching for positions of the withdrawal target objects of the second country capable of providing the currency exchange services, before the step (c).

In addition, if the withdrawal target object is the ATM terminal, in the step (c), after an issuance of the request of the withdrawal identification information is performed to an ATM partner server of the second country according to the receiving of the withdrawal request of the money deposited in the currency of the second country from the user terminal, the withdrawal identification information received from the ATM partner server is provided to the user terminal.

In addition, in the step (d), the amount of the money of the currency of the second country requested by the user terminal is subtracted in the virtual wallet, and the withdrawal of the currency of the second country is performed in the ATM terminal without an ATM card, when receiving a message indicating that authentication of the withdrawal identification information is completed from the ATM partner server, as the ATM terminal transfers the withdrawal identification information input by the user to the ATM partner server.

In addition, if the withdrawal target object is the affiliated store terminal of the second country, in the step (c), the withdrawal identification information is generated and the withdrawal identification information is transmitted to the user terminal, according to the receiving of the withdrawal request of the money deposited in the currency of the second country from the user terminal, in the step (d), information recognizing the withdrawal identification information transmitted from the terminal of the affiliated store to the user terminal is received according to presenting the withdrawal identification information received in the user terminal of the user to the affiliated store by the user, when the received information coincides with the withdrawal identification information generated by the main server, an authentication completion message is transmitted to the terminal of the affiliated store, and the amount of money of the currency of the second country requested by the user terminal is subtracted in the virtual wallet.

In addition, in the step (d), the withdrawal identification information is received from the affiliated store terminal according to the recognition of the withdrawal identification information displayed on a screen of the user terminal by the affiliated store terminal.

In addition, a process of providing the deposit request information in the step (a) and a payment completion confirmation process in the step (b) are performed based on any one of a bank account deposit, a card payment, virtual currency-based payment, and a mobile phone bill-based payment.

In addition, a main server for providing foreign currency exchange services for a person after departure, the main server comprising: a memory that stores a program for providing the currency exchange services; and a processor that provides a method for providing the foreign currency exchange services by performing the program stored in the memory, wherein the processor: when a request of a foreign currency exchange is received from a user terminal registered in a telecommunication company of a first country, provides deposit request information corresponding to the request of the foreign currency exchange; when it is confirmed that a payment or transfer is completed according to the deposit request information, depositing an amount of money of a currency of the first country, which is currency-exchanged into a currency of a second country, in a virtual wallet corresponding to the user terminal; provides the user terminal with withdrawal identification information and position information of a withdrawal target object after confirming a balance of the virtual wallet with respect to the user terminal; and in the second country, as the user of the user terminal visits a place where the withdrawal target object is positioned to provide predetermined input information, when input information of a user is received from the withdrawal target object and the input information of the user and the withdrawal identification information correspond to each other, causes the withdrawal of the amount of money of the foreign currency exchange requested by the user terminal to be performed within an amount of money deposited in the currency of the second country through a withdrawal target object, wherein the withdrawal target object means an affiliated store terminal of the second country or an automated teller machine (ATM) terminal of the second country, and wherein the virtual wallet is linked to a first country main account of a first country bank server and a second country main account of a second country bank server, the deposited currency of the first country is transmitted to the first country main account, the requested withdrawal money is withdrawn from the second country main account, and the first country main account and the second country main account are associated with the main server.

In the conventional case, a traveler is provided with a service in a method for performing the foreign currency exchange at home and withdrawing money, which is currency-exchanged, from abroad through a bank account held at home. That is, a route in which the money is deposited and a route in which the money is withdrawn are unified by a medium such as the bank account at home. In such a case, the exchange fee of the bank should be involved, and a consumer must pay the exchange fee. However, the present invention is characterized in that a method for depositing money is provided in a variety of methods, such as direct deposit, card payment, and firm banking, and withdrawal can be performed from abroad through a method (ATM terminal, affiliated store, or the like abroad) which is different from the method for depositing money. In this process, the exchange fee of the bank is eliminated, and the service operator of the present invention can establish an operation policy for the fee or the like. In addition, there is a great effect in that the service operator provides the users with the foreign currency exchange services with a lower fee than that of the commercial bank.

In particular, the service operator the present invention provides a role of the virtual account of the country, so that it is possible to provide a service that allows the user to perform the foreign currency exchange and withdraw money on site even if the user does not have a local bank account of another country.

In the process of the foreign currency exchange, it is possible to receive a lower exchange fee or more preferential benefits than those of the method for the foreign currency exchange of the related art, and freely perform the foreign currency exchange by searching for a nearby ATM terminal and affiliated store without being bound by time even in the travel destination.

BRIEF DESCRIPTION OF THE DRAWINGS

FIG. 6 is an operation flowchart illustrating a process of withdrawal in a case in which the withdrawal target object is an affiliated store, according to an example of the present invention.

DETAILED DESCRIPTION OF THE EMBODIMENT

Figure 1:
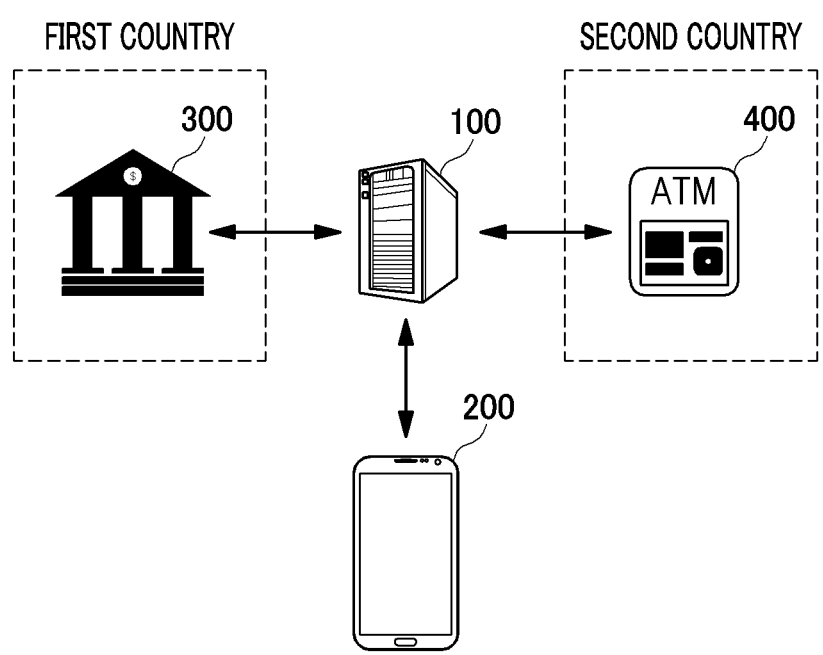
FIG. 1 is a diagram illustrating a configuration of a system for implementing foreign currency exchange services, according to an example of the present invention.

Hereinafter, exemplary examples of the present invention will be described in detail with reference to the accompanying drawings so that those skilled in the art may easily implement the present invention. The present invention may be implemented in various different forms, and the present invention is not limited to the examples described herein. In the drawings, in order to clearly describe the present invention, portions irrelevant to the description are omitted, and like reference numerals designate like portions throughout the specification.

Throughout the specification, when a portion is "connected" to another portion, it includes not only "directly connected" but also "electrically connected" with another element intervened therebetween. In addition, when a portion is said to "include" a certain component, this means that it may further include other components rather than excluding other components unless specifically stated otherwise.

The following examples are detailed description to help readers understand the present invention, and do not limit the scope of the present invention. Therefore, a same range of inventions that perform a same function as the present invention will also fall within the scope of the present invention.

In the following description, "deposit" and "transfer" may refer to actions in which a user pays money for a request of the foreign currency exchange.

FIG. 1 is a diagram illustrating a configuration of a system for implementing foreign currency exchange services, according to an example of the present invention.

Referring to FIG. 1, the system can include a main server 100, a user terminal 200, a first country bank server 300, and a withdrawal target object 400. In addition, although not illustrated in the drawings, each component device is interconnected through a communication network.

According to an example of the present invention, the user terminal 200 performs a request of a foreign currency exchange to the main server 100, and the main server 100 provides the user terminal 200 with deposit request information corresponding to the request of the foreign currency exchange, and then it can be confirmed whether a payment corresponding to the deposit request information has been made.

In this case, the process of providing the deposit request information and confirming whether the payment is made may refer to a process of depositing an amount of money to be currency-exchanged in a virtual wallet of the user terminal 200. For example, the process can include all methods for depositing a bank account such as a method for providing a virtual account generated by the first country bank server 300 belonging to the first country, a general deposit method for performing the deposit of money from a user after directly providing the generated account to operate a service by the user terminal 200, a method of automatically subtracting an amount of money which is currency-exchanged requested by the user from the bank account input by the user, and a firm banking method, in a method for performing the deposit. In addition, the process can include a variety of methods, such as a mobile phone payment, a card payment method, a virtual money-based payment method for presenting an amount of money to be paid and causing payment to be made by various means. Although not described in the example described above, other methods that can be applied to a service implementation method or an environment thereof may also be applied.

Hereinafter, the present specification will be described to correspond to a representative example of a method for using a virtual account for a smooth description of the present invention. However, the scope of the present invention is not limited only to the method for using the virtual account.

In addition, when the currency of the first country of which the currency is to be exchanged is paid through a method corresponding to the deposit request information, the main server 100 recognizes the payment and generates the virtual wallet to transfer the currency of the first country to which the deposit was made to the currency of the second country, and execute the deposit.

In this case, if the money of the predetermined value required for the foreign currency exchange is not deposited from the user, the main server 100 can transmit a deposit rejection message indicating that the user terminal 200 rejects the deposit for the given amount of money. In addition, the currency of the first country deposited in the payment method corresponding to the deposit request information can be refunded. This means that the main server 100 performs an approval for the completion of the deposit only when a valid amount of money coincides with the foreign currency exchange. For example, a dollar of 1,200 won is required for the foreign currency exchange using the won, but the user can deposit a won that is not suitable for the foreign currency exchange of the dollar, such as 1,000 won or 2,000 won. In this case, the main server 100 provides the user terminal 200 with a warning message or the like and prevents a wrong operation of the foreign currency exchange from being performed.

Here, the virtual wallet may refer to a virtual wallet that is linked to each user terminal 200 or individual identification information of the user and is generated to distinguish the currency of the first country where a plurality of users respectively deposit.

In addition, the virtual wallet can be linked to the first country main account of the first country bank server 300 and the second country main account of the second country bank server, which is not illustrated in the drawings. In addition, the currency of the first country, which is paid in a payment method corresponding to the deposit request information, can be transferred to the first country main account, and the requested money can be withdrawn from the second country main account.

For example, when a specific user deposits the currency of the first country into the virtual account for 1,200 won, the virtual wallet maps with the specific user and deposits the currency of the second country by one dollar.

Therefore, a minimum amount of money should be deposited in first and second main accounts to provide foreign currency exchange services in order to deposit or withdraw currency of the first country and the second country from each other.

Thereafter, when the user who visits the second country requests the withdrawal application for the currency of the second country through the user terminal 200 to the main server 100, the main server 100 generates the withdrawal identification information and provides the user terminal 200 with the withdrawal identification information.

In this case, in an optional example, the main server 100 can further go through an operation of confirming a balance of the virtual wallet for the user terminal 200.

In addition, the withdrawal identification information can refer to any one of code information configured of at least one of predetermined numbers, characters, and symbols, a password input by the user, one time password (OTP) information, a barcode, and a QR code.

In addition, withdrawal identification information is generated in response to the request of the foreign currency exchange after the user terminal 200 performs the request of the foreign currency exchange to the main server 100.

In a further example, the withdrawal identification information cannot be used again when a predetermined time passes or the withdrawal identification information is used for withdrawal. In this case, for the expired withdrawal identification information, the user terminal 200 must newly request the withdrawal identification information to the main server 100.

After providing the user terminal 200 with the withdrawal identification information, the main server 100 can receive input information of the user from the withdrawal target object 400 of the second country. When the input information of the user is received, the main server 100 can compare the input information with the withdrawal identification information.

If the two information match, it is characterized in that the withdrawal of the currency of the second country requested by the user terminal 200 is made within the balance of the amount of money of the foreign currency exchange deposited in the virtual wallet through the withdrawal target object 400.

That is, when the confirmation for the user terminal 200 is completed, money is withdrawn in a local currency of the second country from the withdrawal target object 400 by the amount of money of the foreign currency exchange denominated in a currency unit of the second country previously deposited in the virtual wallet.

According to an example of the present invention, the main server 100 can receive the request of the foreign currency exchange from the user terminal 200, and perform the foreign currency exchange of the deposited currency of the first country into the currency of the second country to deposit the currency of the second country in the virtual wallet. On the contrary, when the main server 100 receives the withdrawal request, the withdrawal identification information can be generated to be transmitted to the user terminal 200. Thereafter, it is characterized in that the main server 100 receives the input information of the user from the withdrawal target object 400 and compares the input information with the withdrawal identification information, and thereby the amount of money of the foreign currency exchange (money exchange certificate) deposited in the money unit of the second country can be withdrawn.

According to an example of the present invention, the user terminal 200 can be registered in a telecommunication company of the first country and correspond to the user terminal which performs the foreign currency exchange.

In this case, the user terminal 200 performs the request of the foreign currency exchange to the main server 100 and receives an account number for depositing the currency of the first country. In addition, it is characterized in that when the user terminal 200 requests the withdrawal request to the main server 100, the withdrawal identification information is received.

In addition, the user terminal 200 can notify the user by displaying how much currency of the first country is currency-exchanged into the currency of the second country, how much the user gets a discount on an exchange fee from a commercial bank, or the like.

In this case, an application for providing the foreign currency exchange services may be an application embedded in the user terminal 200 or an application downloaded from an application distribution server and installed in the user terminal 200.

In addition, the user terminal 200 refers to a communication terminal capable of using a terminal application in a wired or wireless communication environment. Here, the user terminal 200 can be a portable terminal of the user. In FIG. 1, although the user terminal 200 is illustrated as a smart phone, which is a kind of the portable terminal, the spirit of the present invention is not limited thereto, and as described above, the terminal, on which the terminal application is mounted, can be adopted without limitation.

In more detail, the user terminal 200 can include a handheld computing device (for example, a PDA, an email client, or the like), any form of cellular phone, or any form of other kinds of computing or communication platform. However, the present invention is not limited thereto.

According to an example of the present invention, the first country bank server 300 is located in the first country, may refer to a server owned by a bank managing the currency of the first country to which the user using the user terminal 200 belongs.

In this case, the first country bank server 300 manages the main account of the first station to provide the foreign currency exchange services, and deposits the currency of the first country, which is paid by the user to the first country main account according to the deposit request method linked to the main server 100.

Further, in another example, when the deposit request method corresponds to the virtual account, the first country bank server 300 provides the main server 100 with a virtual account issuing rule in advance, so that the main server 100 can lead the generation of the virtual account information.

In addition, although not illustrated in the drawings, a second country bank server can manage a second country main account required to provide the foreign currency exchange services. When the second country bank server receives the withdrawal request from the main server 100 or the withdrawal target object 400, the second country bank server provides the user with currency of the second country.

According to an example of the present invention, the withdrawal target object 400 may refer to an affiliated store of the second country or an automated teller machine (ATM) terminal of the second country. In this case, it is characterized in that the withdrawal target object 400 withdraws the currency of the second country according to the request of the user (or user terminal 200) to provide the user with the money.

In this case, the withdrawal target object 400 receives the withdrawal identification information provided from the user to the user terminal 200 as the input information of the user and transfers the withdrawal identification information to the main server 100.

Thereafter, when a withdrawal instruction is issued from the main server 100, the withdrawal target object 400 provides the user with the amount of currency of the second country according to an implemented form (in this case, if the withdrawal target object 400 is the ATM terminal, an ATM partner server performs the withdrawal instruction for the amount of currency of the second country). Here, the ATM partner is an ATM operator, which means a company that has a partnership with a main server operator.

For example, when the withdrawal target object 400 is implemented in the form of the ATM terminal, the currency of the second country already deposited in the second country main account is directly withdrawn and transferred to the user. The user can withdraw money from the ATM terminal even without an ATM card, even if the user does not have his/her account in the second country.

However, if an owner (store located in the second country, which can provide the user with the currency of the second country, or the like) of the affiliated store terminal provides the currency of the second country, the currency of the second country owned by the affiliated store can be provided to the user by the withdrawal amount of money or subtract the money for a value of an item to be purchased. Thereafter, the amount of money deposited in the second country main account will be paid to the affiliated store as much as the amount of currency of the second country provided to the user.

Here, the affiliated store may be a store selling general items or a general service company providing other services. Alternatively, the affiliated store may further include a bank. The terminal of the affiliated store may be a terminal located in a store or a company, a terminal owned by a store owner or an operator, a terminal located in a bank, or a terminal operated by a bank teller.

On the other hand, a communication network serves to connect the server 100, the user terminal 200, the first country bank server 300, and the withdrawal target object (400). That is, the communication network refers to a communication network that provides a connection path so that the user terminal 200, the first country bank server 300, and the withdrawal target object 400 can transmit and receive data after being connected to the server 100. The communication network can include, for example, a wired network such as local area networks (LANs), wide area networks (WANs), metropolitan area networks (MANs), or integrated service digital networks (ISDNs), or a wireless network such as wireless LANs, a CDMA, a Bluetooth, or satellite communication. However, the scope of the present invention is not limited thereto.

Figure 2:
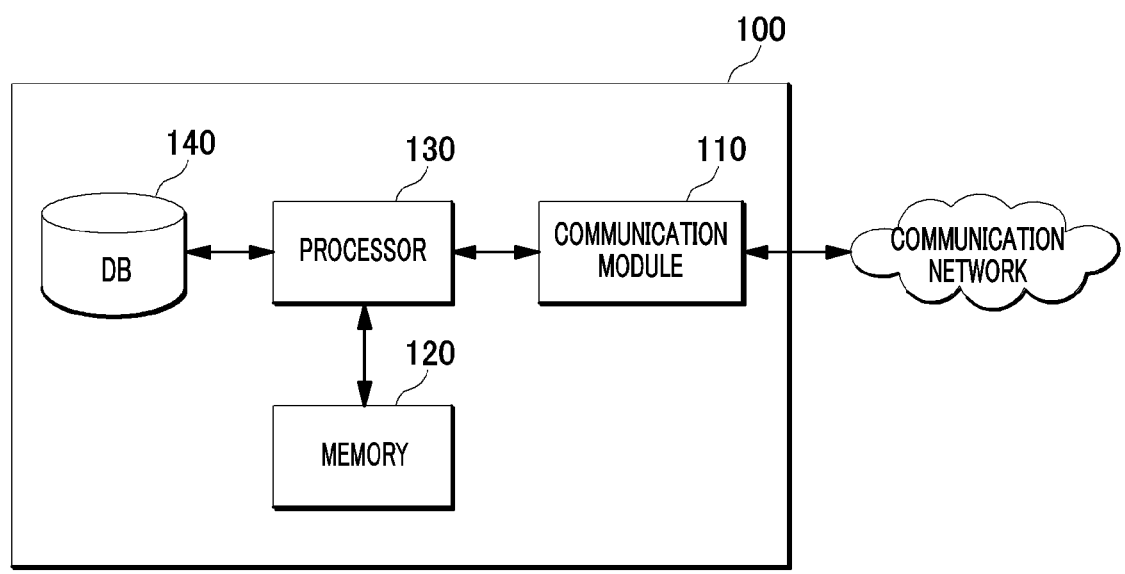
FIG. 2 is a diagram illustrating a configuration of a main server, according to an example of the present invention.

FIG. 2 is a diagram illustrating a configuration of a main server, according to an example of the present invention.

Referring to FIG. 2, the main server 100 according to an example of the present invention includes a communication module 110, a memory 120, a processor 130, and a database 140.

In detail, the communication module 110 provides a communication interface for providing transmission/reception signals among the main server 100, the user terminal 200, the first country bank server 300, and the withdrawal target object 400 in a form of packet data by being linked to the communication network. In addition, the communication module 110 can receive a data request from the user terminal 200, the first country bank server 300, and the withdrawal target object 400, and transmit data as a response thereto.

Here, the communication module 110 may be a device including hardware and software required to transmit and receive signals such as a control signal and a data signal to and from another network device through a wired or wireless connection.

The memory 120 records a program for providing the foreign currency exchange services. In addition, the memory 120 performs a function of temporarily or permanently storing data processed by the processor 130. Here, the memory 120 can include a magnetic storage media or a flash storage media, but the scope of the present invention is not limited thereto.

The processor 130 is a kind of central processing unit and controls an entire process of providing the foreign currency exchange services. Each step performed by the processor 130 will be described later with reference to FIGS. 3 to 6.

Here, the processor 130 can include all kinds of devices capable of processing data, such as a processor. Here, the 'processor' can refer to a data processing device embedded in hardware having, for example, a circuit physically structured to perform a function represented by a code or instructions included in a program. An example of the data processing device embedded in the hardware can include a microprocessor, a central processing unit (CPU), a processor core, a multiprocessor, an application-specific integrated circuit (ASIC), a field programmable gate array (FPGA), or the like, but the scope of the present invention is not limited thereto.

The database 140 can store the virtual account and the virtual wallet corresponding to the request of the foreign currency exchange received from the user terminal 200.

In addition, when receiving the withdrawal request, the withdrawal identification information provided to the user terminal 200 is temporarily stored, and compared with the input information of the user received from the withdrawal target object (400).

In addition, as a further example, the individual identification information of the user or the information of the user can be stored, and data that the user has performed the foreign currency exchange (or trade) can be left in a form of a log record.

Although not illustrated in FIG. 2, some of the virtual account and virtual wallet data corresponding to the request of the foreign currency exchange can be stored in a database (not illustrated) that is physically or conceptually separated from the database 140.

Figure 3:
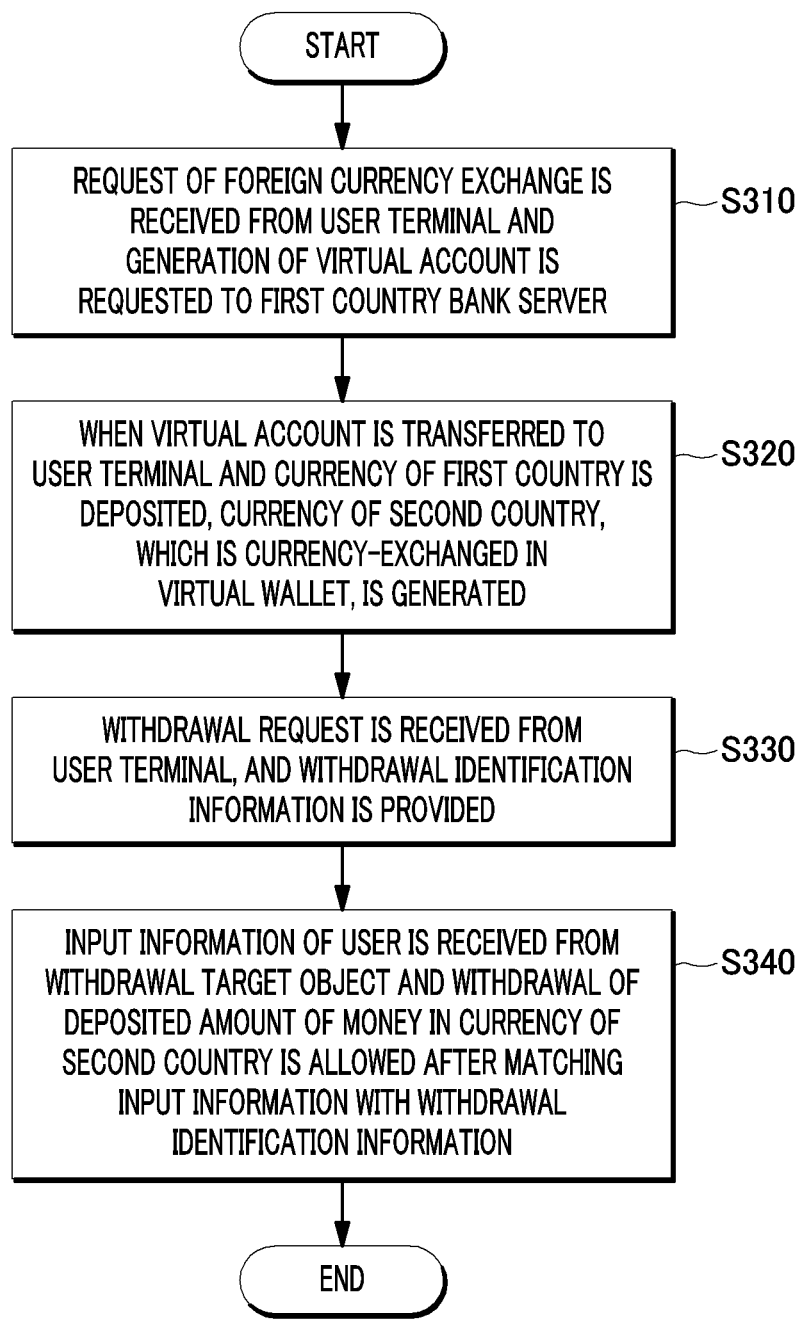
FIG. 3 is an operation flowchart illustrating a method for providing the foreign currency exchange services using a virtual account, according to an example of the present invention.

FIG. 3 is an operation flowchart illustrating a method for providing the foreign currency exchange services using the virtual account, according to an example of the present invention.

Referring to FIG. 3, the main server 100 receives the request of the foreign currency exchange from the user terminal 200 and requests the generation of the virtual account to the first country bank server 300 (S310).

In detail, the main server 100 can receive the request of the foreign currency exchange from the user terminal 200 registered in the telecommunication company of the first country. Accordingly, the generation of the virtual account corresponding to the request of the foreign currency exchange is requested to the first country bank server 300 which is a bank belonging to the first country.

In this case, in order to perform the foreign currency exchange services, the first country main account in which the currency of the first country is deposited is required, and the virtual account generated in step S310 should be linked to the first country main account.

Next, when the virtual account is transferred to the user terminal 200 and the currency of the first country is deposited, the main server 100 generates and deposits the currency of the second country, which is currency-exchanged in the virtual wallet (S320).

In detail, in step S310, the main server 100 transfers the virtual account opened in the first country bank server 300 to the user terminal 200.

Thereafter, when the currency of the first country that the user wants to perform the foreign currency exchange through the virtual account is deposited from the user, the main server 100 generates the virtual wallet corresponding to the user terminal 200 to deposit the foreign currency (currency exchange certificate) exchanged into the currency of the second country.

In this case, the process of the withdrawal request corresponding to the step S310 to step S320 will be further described with reference to FIG. 4 (described later).

Next, the main server 100 receives the withdrawal request from the user terminal 200, generates the withdrawal identification information, and provides the user terminal 200 with the withdrawal identification information (S330).

In detail, when the main server 100 receives the withdrawal request for the currency of the second country from the user terminal 200 located in the second country, the main server 100 confirms the balance of the virtual wallet with respect to the user terminal 200, and then generates the withdrawal identification information to provide the user terminal 200 with the withdrawal identification information.

As a final step of the foreign currency exchange services, the main server 100 receives the input information of the user from the withdrawal target object 400 and allows the withdrawal of the amount of money deposited in the currency of the second country after matching the input information with the withdrawal identification information (S340).

In detail, the main server 100 receives the input information of the user from the withdrawal target object 400 located in the second country.

In this case, the input information of the user refers to the withdrawal identification information or information corresponding thereto provided to the user terminal 200.

Accordingly, the withdrawal target object 400 directly receives the withdrawal identification information from the user terminal 200 on site, or an administrator of the withdrawal target object 400 directly inputs the input information to transfer the input information to the main server 100.

When the input information corresponds to the withdrawal identification information provided to the user terminal 200, the main server 100 withdraws the amount of money deposited in the virtual wallet as the currency of the second country through the object to be withdrawn 400 as much as an amount of money requested by the user terminal 200, thereby providing the user with the currency exchange services to receive the exchanged foreign currency.

On the other hand, after steps S310 and S320 are performed in the first country, after the user leaves for the second country, steps S330 and S340 may be performed in the second country. Alternatively, all steps from step S310 to step S340 may be performed in the second country. For example, if the user transfers $100 in the first country, receives it in the amount currency-exchanged in the second country, and then exhausts all the exchanged amount, the user may transfer additional $50 in the second country, and can also receive the exchanged money. In this case, the users do not need to have the anxiety of carrying a lot of money from the beginning of the travel and carrying it in their wallet. That is, the user only need to travel as much as you need and exchange money In this case, the process of the withdrawal request corresponding to the step S330 to step S340 will be further described with reference to FIGS. 5 and 6 (described later).

Figure 4:
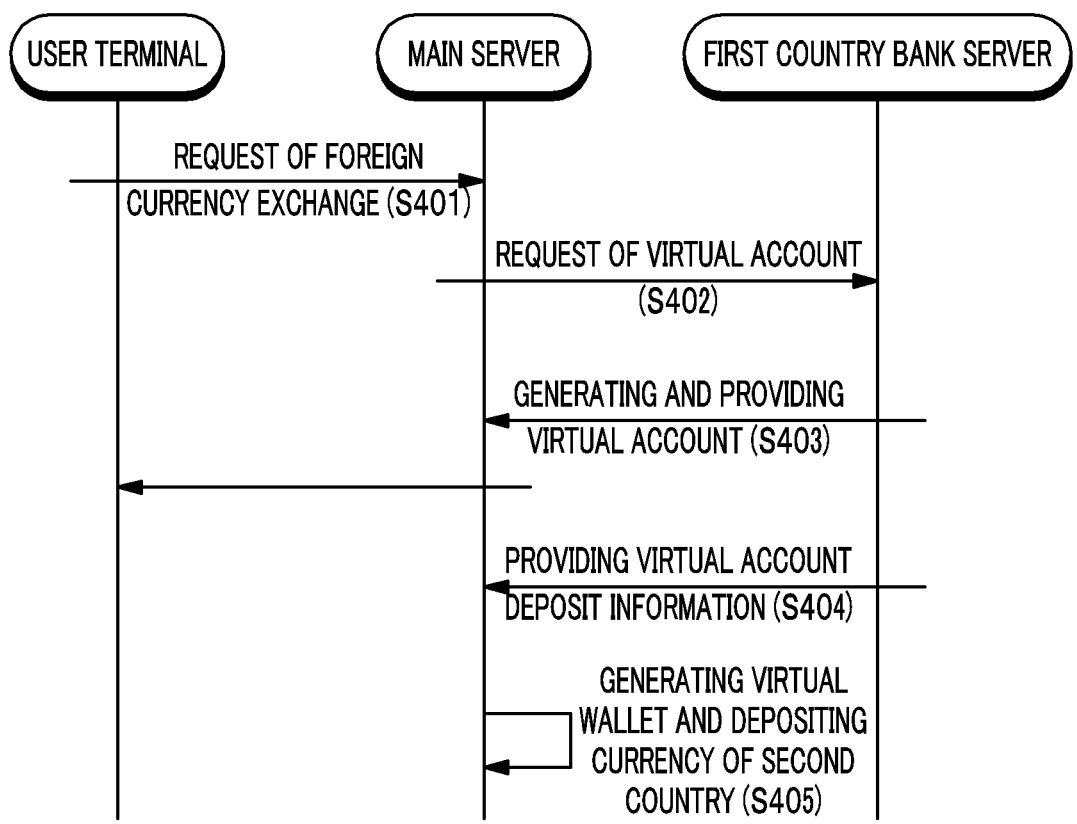
FIG. 4 is an operation flowchart illustrating a process of a request of a foreign currency exchange using the virtual account, according to an example of the present invention.

FIG. 4 is an operation flowchart illustrating the process of the request of the foreign currency exchange using the virtual account, according to an example of the present invention.

Referring to FIG. 4, in the process of the request of the foreign currency exchange, the user terminal 200 requests the main server 100 of the request of the foreign currency exchange.

In this case, the main server 100 receives, from the user terminal 200, information on the second country of which the currency is to be exchanged and information on the amount of money of the currency of the first country to be deposited by the user, as request information of the foreign currency exchange.

In addition, the main server 100 can provide the user terminal 200 with the exchangeable amount of money based on the currency of the second country based on a predetermined exchange rate. In addition, the user terminal 200 displays the exchangeable amount of money on a display screen.

In addition, the main server 100 can additionally provide the user terminal 200 with a comparison interface for comparing the exchangeable amount of money based on the commercial bank exchange rate of the first country with the exchangeable amount of money based on the predetermined exchange rate. With the comparison interface, the user can confirm how much he/she saves the exchange fee through the foreign currency exchange services.

In this case, the predetermined exchange rate is calculated in consideration of the predetermined exchange fee (fee set by a service provider to provide the foreign currency exchange services). Therefore, the predetermined exchange rate can be measured at a lower price than the commercial bank exchange fee of the first country. On the contrary, although the predetermined exchange rate is more expensive than the commercial bank exchange fee of the first country, the user can be induced to use the foreign currency exchange services proposed by the present invention, such as an additional premium service.

In addition, in the step in which the main server 100 receives, from the user terminal 200, the information of the second country of which the currency is to be exchanged, and the amount of money of the currency of the first country to be deposited by the user, the main server 100 can provide the user terminal 200 with the user interface. Therefore, the amount of currency of the first country, which is converted according to the predetermined exchange rate based on the amount of money of the currency of the second country, is input as the amount of money of the request of the foreign currency exchange.

As a further example, when the user deposits the currency of the first country, the deposited amount of money may be less than or equal to a minimum value necessary to perform the foreign currency exchange with the currency of the second country, or money less than or equal to the minimum value necessary to perform the foreign currency exchange may be left behind during the exchange process. In this case, the main server 100 can recognize this and transfer an additional deposit request message for the currency of the first country to the user terminal 200. For example, it is assumed that that the exchange rate is KRW (1,200 won)-

Dollar (1 USD), and when the user deposits 2,000 won into the virtual account, the main server 100 provides a message requesting the user terminal 200 of depositing an additional 400 won necessary for the foreign currency exchange of 2 USD.

Next, in order to provide the foreign currency exchange services, the main server 100 receiving the request of the foreign currency exchange requests the virtual account to the first country bank server 300 (S402).

In this case, as described above, in order to provide the foreign currency exchange services, the main server 100 needs the first country main account in which the currency of the first country is already deposited, and the first country bank server 300 generates the virtual wallet necessary to deposit the currency of the first country by being linked to the first country main account.

Next, the first country bank server 300 generates the virtual account and transfers the virtual account to the main server 100, and the main server 100, which receives the virtual account, also transfers the virtual account to the user terminal 200 (S403).

In this case, the virtual account can be transferred to the user terminal 200 via the main server 100, but the first country bank server 300 can directly provide the user terminal 200 with the virtual account. For example, the main server 100, which receives the information on the virtual account from the first country bank server 300, can notify the user terminal 200 of the information, but this process is omitted and the first country bank server 300 can directly notify the user terminal 200 of the information on the virtual account at the same time with the generation of the virtual account.

Next, the first country bank server 300 provides the main server 100 with the virtual account deposit information (S404).

The user must deposit the currency of the first country to which he/she wishes to perform the foreign currency exchange to the first country main account through the virtual account. Thereafter, the main server 100 must recognize that the user performs the foreign currency exchange of the money denominated in the currency of the first country to the money denominated in the currency of the second country, through a method of receiving, by the main server 100, a message recognizing whether or not the user terminal 200 is operated, or the deposit from the first country bank server 300 is completed.

Finally, the main server 100 generates the virtual wallet and deposits the amount of the money which is currency-exchanged into the currency of the second country (S405).

Figure 5:
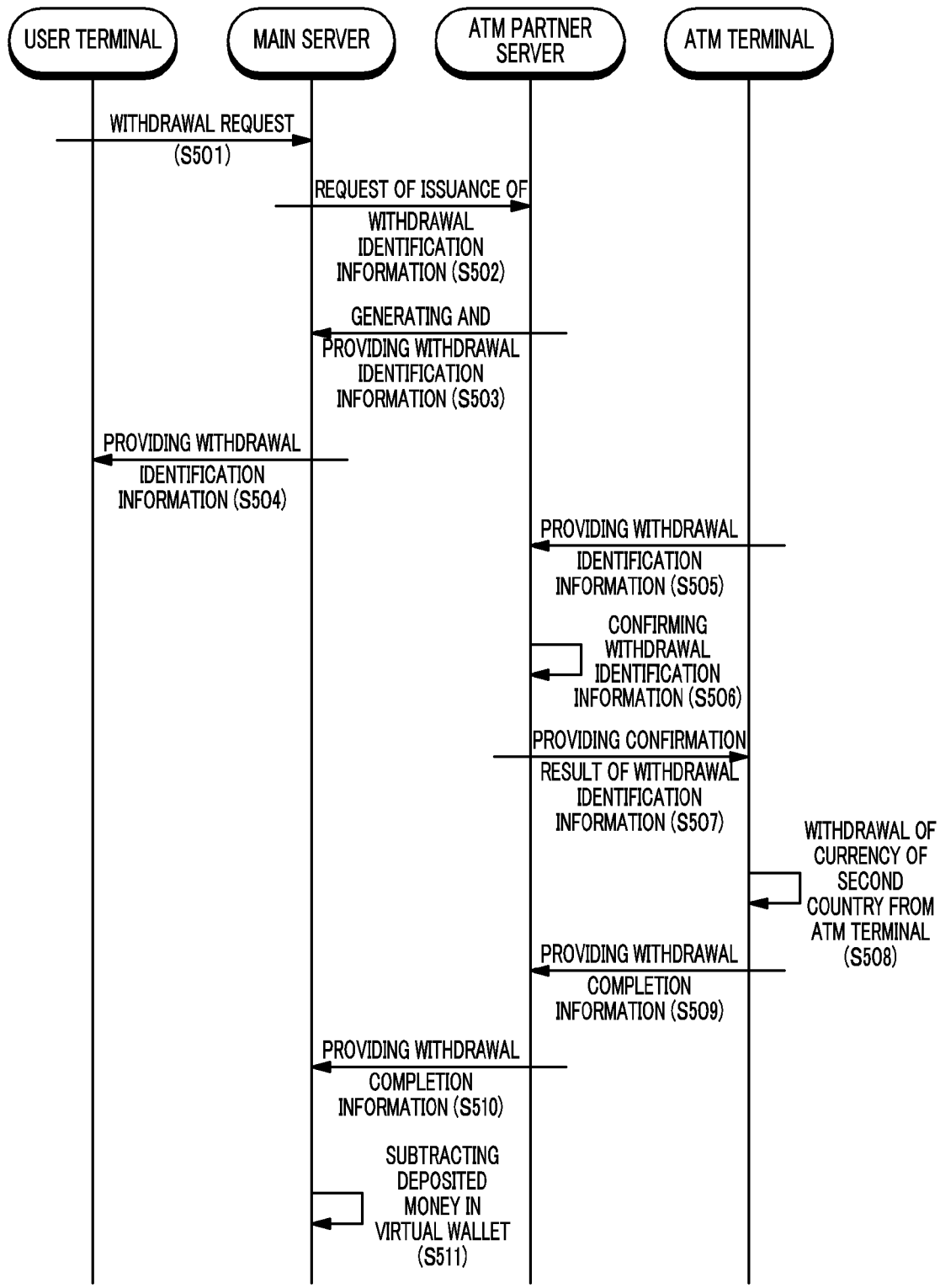
FIG. 5 is an operation flowchart illustrating a process of withdrawal in a case in which a withdrawal target object is an ATM terminal, according to an example of the present invention.

FIG. 5 is an operation flowchart illustrating a process of withdrawal in a case in which the withdrawal target object is the ATM terminal, according to an example of the present invention.

Referring to FIG. 5, when the withdrawal target object 400 is the ATM terminal, the user terminal 200 provides the main server 100 with the withdrawal request (S501).

The main server 100 receiving the withdrawal request requests issuance of the withdrawal identification information to the ATM partner server (S502).

Next, when the ATM partner server generates the withdrawal identification information and then provides the main server 100 with the withdrawal identification information (S503), the main server 100 provides the user terminal 200 with the same (S504).

When the ATM partner server receives the withdrawal identification information from the ATM terminal (S505), the ATM partner server performs authentication on whether the withdrawal identification information is correct (S506), and provides the ATM terminal with a confirmation result of the withdrawal identification information (S507). Meanwhile, the main server 100 may issue the withdrawal identification information and transmit it to the ATM partner server and the user terminal 200 to perform the user authentication.

Alternatively, when the withdrawal is requested, the user inputs the withdrawal identification information, and after the main server 100 transmits it to the ATM partner server, if the information received later from the ATM terminal matches the withdrawal identification information input by the user, the authentication can also be treated as being completed.

In addition, in a further example, when the wrong withdrawal identification information is received from the ATM terminal, the ATM partner server can transfer an error message indicating that the withdrawal identification information is wrong to the display screen provided in the ATM terminal. In addition, the ATM partner server can newly update the withdrawal identification information and transfer a message of performing the authentication to the ATM terminal.

After step S507, the user withdraws the currency of the second country through the ATM terminal (S508).

In addition, the ATM partner server receives the withdrawal completion information indicating that the withdrawal of the currency of the second country is completed from the ATM terminal (S509), and the ATM partner server provides the main server 100 with the withdrawal completion information (S510).

Finally, the main server 100 subtracts the withdrawal amount of money from the amount of money deposited in the virtual wallet (S511).

FIG. 6 is an operation flowchart illustrating a process of withdrawal in a case in which the withdrawal target object is the affiliated store, according to an example of the present invention.

Referring to FIG. 6, when the withdrawal target object 400 is the affiliated store, the user terminal 200 provides the main server 100 with the withdrawal request (S601).

The main server 100 generates the withdrawal identification information and provides the user terminal 200 with the withdrawal identification information (S602).

Thereafter, when the affiliated store terminal receives the input information of the user from the user (S603), the affiliated store terminal provides the main server 100 with the input information of the user (S604).

In this case, the affiliated store terminal recognizes the withdrawal identification information displayed on the display screen of the user terminal 200, and receives the input information corresponding to the withdrawal identification information. For example, when the withdrawal identification information is the barcode or the QR code, it can be recognized by a scanner linked to the affiliated store terminal.

The main server 100 performs an authentication operation for comparing the received input information with the withdrawal identification information (S605), and when the authentication is completed, the main server 100 provides the affiliated store terminal with an authentication completion message (S606).

In this case, the authentication completion message includes information for identifying which user should withdraw the currency of the second country and how much currency of the second country should be provided.

Thereafter, the administrator of the affiliated store terminal provides the user with the currency of the second country (S607), and transfers the withdrawal completion information to the main server 100 through the affiliated store terminal (S608).

Finally, the main server 100 finishes the step by subtracting the withdrawal amount of money from the amount of money deposited in the virtual wallet (S609).

The withdrawal through the affiliated store may be preferentially withdrawn from the account (account of the second country) of the owner of the affiliated store. Likewise, the ATM withdrawal may be preferentially withdrawn from any account (account of second country), which may be an account of a subject in the second country that is in partnership with the main server. Thereafter, the amount of money may be transferred from the second main account to the account of the owner of the affiliated store as much as the amount withdrawn from the account of the owner of the affiliated store. Likewise, the amount of money may be transferred from the second main account to any account as much as the amount withdrawn from any account. However, the transfer is not made every time the withdrawal occurs, but after the withdrawal of specific times (for example, 10 times) occurs, a sum of money of the 10 withdrawals may be transferred. Likewise, in the case of amounts transferred by users from the first country to the virtual account, it may be transferred from the virtual account to the first main account whenever the transfer of the individual virtual account of the user occurs, but when the amounts of transfer money of the users are collected to some extent, the amounts can be transferred to the first main account at a time. In this case, only the withdrawal is made continuously from the second main account, and only the deposit is made from the first main account. At a regular time, the transfer is made from the first main account to the second main account by a certain amount. The owners of the first main account and the second main account may be the same subject or may be in a partnership with each other.

In general, in the case of currency exchange through a conventional bank, an exchange fee is incurred each time money is exchanged. The fee of the bank includes all foreign air transportation costs, distribution costs by bank branches, manpower management costs, and bank revenues. However, in the case of the present invention, although a currency exchange service is received at the situation of the user, in practice, a certain amount of money transfer is not made from the first country to the second country when the exchange service is performed once. When a large amount of transfer of users is collected, the transfer is made from the first country to the second country at a time. For example, in a case where 10 users use currency exchange services 10 times, and then perform one transfer from the first main account in the first country to the second main account in the second country, the users receive the exchange service 10 times. However, at the situation of the service operator, only one exchange fee is actually paid, so it is possible to provide the users with a much lower exchange fee than that of the commercial bank.

In a further example, after step S609, the affiliated store that has paid the user of the currency of the second country is compensated for the currency of the second country by the amount of money provided by withdrawing money from the second country main account to the user, later.

Also, in an optional example, before step S501 and step S601, the main server 100 can provide a search interface capable of searching for the positions of the withdrawal target objects 400 of the second country which can provide the user terminal 200 with the foreign currency exchange services.

In a further example, the search interface can be given in a form of a map, and the search interface can display the position of the withdrawal target object 400 located within a predetermined range based on position information received from the user terminal 200 as an icon. Thereafter, when the user inputs an icon of the withdrawal target object 400 to which the user can move, the search interface can provide a route guidance from the position of the current user terminal 200 to the position of the selected withdrawal target object 400. In this case, the route guidance to the position of the withdrawal target object 400 can be provided to the user by being linked to a map application such as a Google map.

An example of the present invention can also be implemented in a form of a recording medium including instructions executable by a computer, such as a program module executed by the computer. A computer readable medium can be any available medium that can be accessed by a computer and includes all volatile and nonvolatile media, removable and non-removable media. In addition, the computer readable medium can include a computer storage medium. The computer storage medium includes all volatile and nonvolatile, removable and non-removable media implemented in any method or technology for storage of information such as computer readable instructions, data structures, program modules or other data.

Although the methods and systems of the present invention have been described in connection with specific examples, some or all of their components or operations can be implemented using a computer system having a general purpose hardware architecture.

The foregoing description of the present invention is intended for illustration, and it will be understood by those skilled in the art that the present invention can be easily modified in other specific forms without changing the technical spirit or essential features of the present invention. Therefore, it should be understood that the examples described above are exemplary in all respects and not restrictive. For example, each component described as a single type can be implemented in a distributed manner, and similarly, components described as distributed can be implemented in a combined form.

The scope of the present invention is illustrated by the following claims rather than the above description, and all changes or modifications derived from the meaning and scope of the claims and their equivalents should be construed as being included in the scope of the present invention.

DESCRIPTION OF SYMBOLS

10: main server
200: user terminal
300: first country bank server
400: withdrawal target object

What is claimed is:
1. A method for providing foreign currency exchange services for a person after departure performed by a main server, the method comprising:
(a) receiving a request of a foreign currency exchange from a user terminal registered in a telecommunication company of a first country, and in response to receiving the request, providing deposit request information including an amount of a currency of the first country corresponding to the request of the foreign currency exchange to the user terminal;

(b) confirming that a payment or transfer is completed based on the deposit request information, and in response to confirming that the payment or transfer is completed, generating a virtual wallet corresponding to the user terminal, exchanging an amount of a currency of the first country into an amount of the currency of a second country and depositing the amount of the currency of the second country in the virtual wallet;

(c) receiving a withdrawal request including a withdrawal amount of the currency of the second country from the user terminal located in the second country, confirming a balance of the virtual wallet with respect to the user terminal, and providing the user terminal with withdrawal identification information and position information of a withdrawal target object; and (d) receiving input information of a user from the withdrawal target object and determining that the input information of the user and the withdrawal identification information correspond to each other, and in response to receiving the input information and in response to determining that the input information of the user and the withdrawal identification information correspond to each other, allowing a withdrawal of the withdrawal amount of the currency of the second country requested by the user terminal through the withdrawal target object, wherein the withdrawal target object is an affiliated store of the second country, or an automated teller machine (ATM) terminal of the second country, and wherein the virtual wallet is linked to a first country main account of a first country bank server and a second country main account of a second country bank server, the deposited currency of the first country is transmitted to the first country main account, the withdrawal amount of the currency of the second country is withdrawn from the second country main account, and the first country main account and the second country main account are associated with the main server.

2. The method for providing foreign currency exchange services according to claim 1, wherein the step (a) comprises:

providing the user terminal with an exchangeable amount of money based on the currency of the second country, based on a predetermined exchange rate; and providing a comparison interface that compares an exchangeable amount of money based on a commercial bank exchange rate of the first country with an exchangeable amount of money based on the predetermined exchange rate, and receiving the request of the foreign currency exchange.

3. The method for providing foreign currency exchange services according to claim 2, wherein receiving the information of the second country of which the currency is to be exchanged, and the amount of the currency of the first country to be deposited by the user, from the user terminal, comprises:

providing a user interface for inputting the amount of the currency of the first country converted based on the predetermined exchange rate based on the amount of the currency of the second country as a requested amount of money of the foreign currency exchange.

4. The method for providing foreign currency exchange services according to claim 1, further comprising:

providing the user terminal with a search interface for searching for positions of the withdrawal target objects of the second country capable of providing the currency exchange services, before the step (c).

5. The method for providing foreign currency exchange services according to claim 1, wherein the withdrawal target object is the ATM terminal, and in the step (c), issuing the request of the withdrawal identification information to an ATM partner server of the second country based on the receiving of the withdrawal request of money deposited in the currency of the second country from the user terminal, and providing the withdrawal identification information received from the ATM partner server to the user terminal.

6. The method for providing foreign currency exchange services according to claim 5, wherein in the step (d), the amount of the currency of the second country requested by the user terminal is subtracted in the virtual wallet, and the withdrawal of the currency of the second country is performed in the ATM terminal without an ATM card, a message indicating that authentication of the withdrawal identification information is completed is received from the ATM partner server, as the ATM terminal transfers the withdrawal identification information input by the user to the ATM partner server.

7. The method for providing foreign currency exchange services according to claim 1, wherein the withdrawal target object is the affiliated store of the second country, in the step (c), based on the receiving of the withdrawal request of money deposited in the currency of the second country from the user terminal, the withdrawal identification information is generated and the withdrawal identification information is transmitted to the user terminal, and in the step (d), information recognizing the withdrawal identification information transmitted from a terminal of the affiliated store to the user terminal is received according to presenting the withdrawal identification information received in the user terminal of the user to the affiliated store by the user, the received information matches with the withdrawal identification information generated by the main server, and an authentication completion message is transmitted to the terminal of the affiliated store.

8. The method for providing foreign currency exchange services according to claim 7, wherein in the step (d), the withdrawal identification information is received from the terminal of the affiliated store according to the recognition of the withdrawal identification information displayed on a screen of the user terminal by the terminal of the affiliated store.

9. The method for providing foreign currency exchange services according to claim 1, wherein a process of providing the deposit request information in the step (a) and a payment completion confirmation process in the step (b) are performed based on any one of a bank account deposit, a card payment, virtual currency-based payment, and a mobile phone bill-based payment.

10. The method for providing foreign currency exchange services according to claim 1, further comprising:

determining that an amount of the currency of the second country exchanged from a deposited amount of the currency of the first country based on an exchange rate is not an integer; and transmitting an additional deposit request message to the user terminal in response to determining that the amount of the currency of the second country exchanged from the deposited amount of the currency of the first country based on the exchange rate is not an integer.

11. A main server for providing foreign currency exchange services for a person after departure, the main server comprising:

a memory that stores a program for providing the currency exchange services; and a processor that provides a method for providing the foreign currency exchange services by performing the program stored in the memory, wherein the processor:

receives a request of a foreign currency exchange from a user terminal registered in a telecommunication company of a first country, and in response to receiving the request of the foreign currency exchange is received from the user terminal, provides deposit request information including an amount of a currency of the first country corresponding to the request of the foreign currency exchange to the user terminal;

confirms that a payment or transfer is completed based on the deposit request information, and in response to confirming that the payment or transfer is completed based on the deposit request information, generates a virtual wallet corresponding to the user terminal, exchanges an amount of a currency of the first country into an amount of the currency of a second country and deposits the amount of the currency of the second country in the virtual wallet;

receives a withdrawal request including a withdrawal amount of the currency of the second country from the user terminal located in the second country, confirms a balance of the virtual wallet with respect to the user terminal, and provides the user terminal with withdrawal identification information and position information of a withdrawal target object; and receives input information of a user from the withdrawal target object, determines that the input information of the user and the withdrawal identification information corresponds to each other, and in response to receiving the input information of the user from the withdrawal target object and in response to determining that the input information of the user and the withdrawal identification information correspond to each other, allows a withdrawal of the withdrawal amount of the currency of the second country requested by the user terminal through the withdrawal target object, wherein the withdrawal target object is an affiliated store of the second country or an automated teller machine (ATM) terminal of the second country, and wherein the virtual wallet is linked to a first country main account of a first country bank server and a second country main account of a second country bank server, the deposited currency of the first country is transmitted to the first country main account, the withdrawal amount of the currency of the second country is withdrawn from the second country main account, and the first country main account and the second country main account are associated with the main server.

12. The main server for providing foreign currency exchange services for a person after departure according to claim 11, wherein the processor is further configured to:

determine that an amount of the currency of the second country exchanged from a deposited amount of the currency of the first country based on an exchange rate is not an integer; and transmit an additional deposit request message to the user terminal in response to determining that the amount of the currency of the second country exchanged from the deposited amount of the currency of the first country based on the exchange rate is not an integer.

* * * * *